Jan. 21, 1969    O. A. YOST    3,422,889
FAST PIPE COUPLING FOR OFFSHORE DRILLING
Filed Jan. 3, 1967    Sheet 1 of 7

INVENTOR
Oscar A. Yost
BY
Polachek & Saulsbury
ATTORNEYS

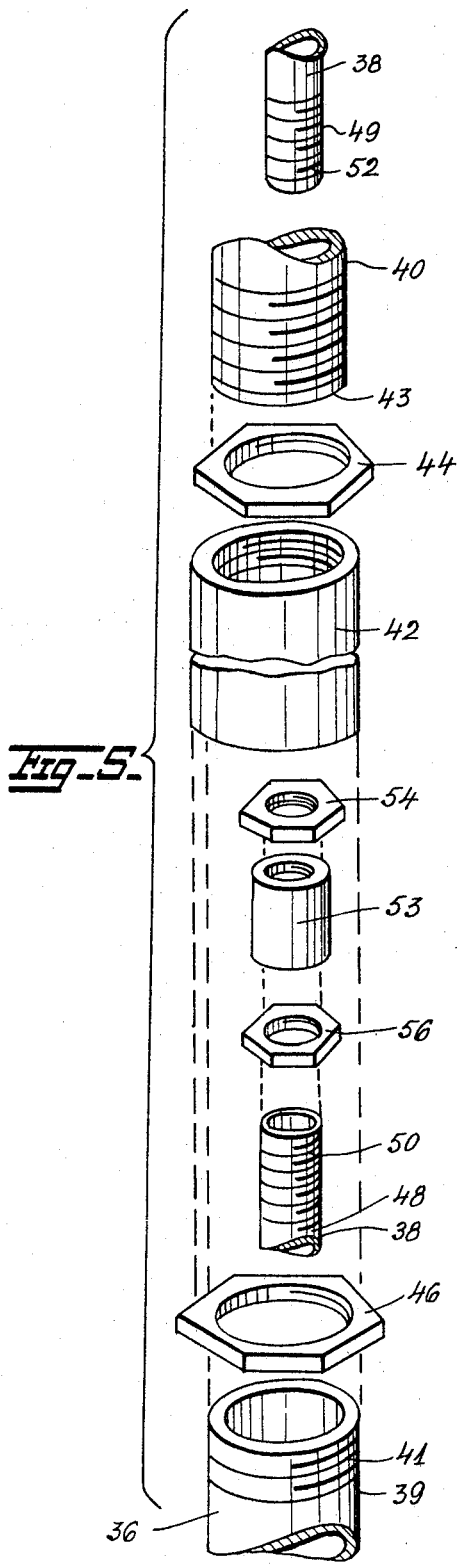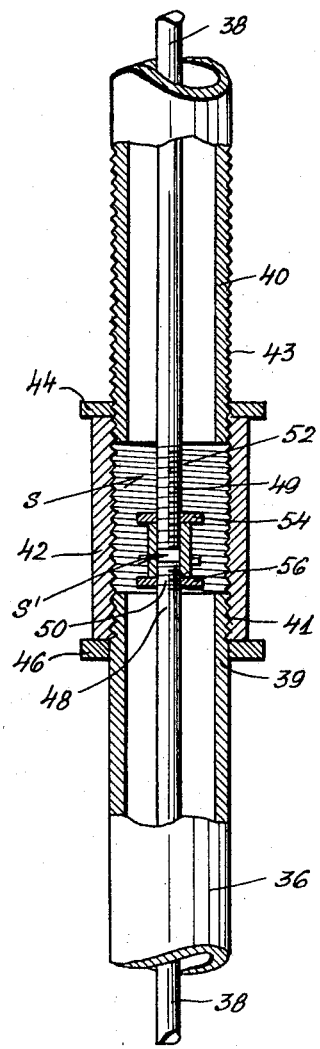

Jan. 21, 1969     O. A. YOST     3,422,889
FAST PIPE COUPLING FOR OFFSHORE DRILLING
Filed Jan. 3, 1967     Sheet 4 of 7
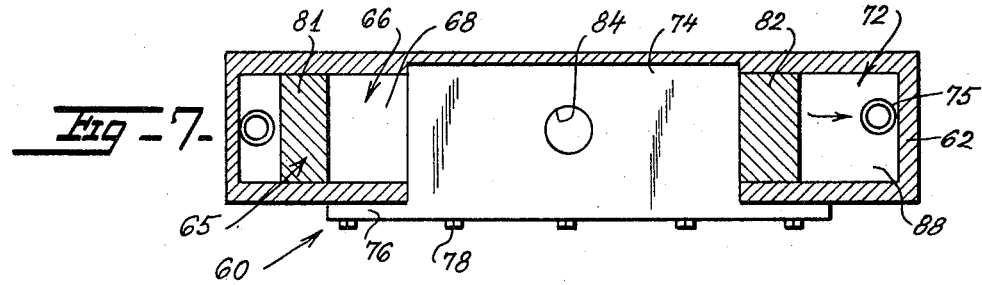
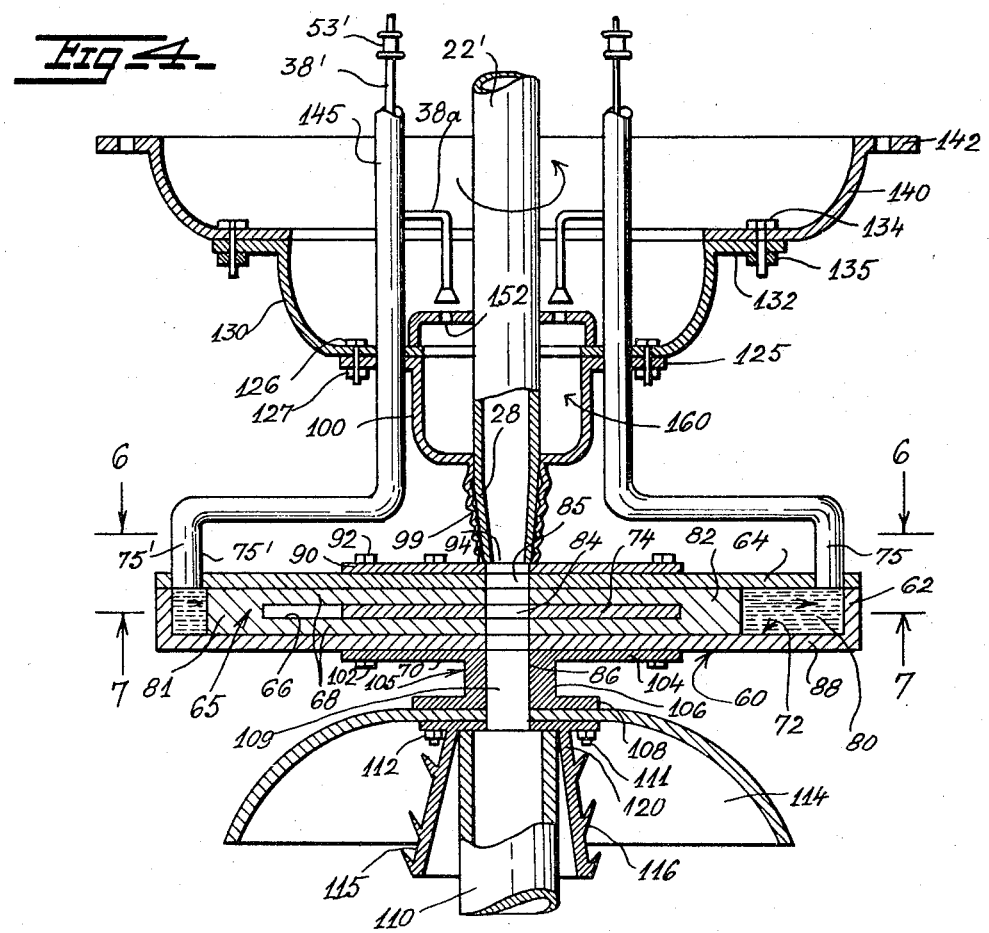
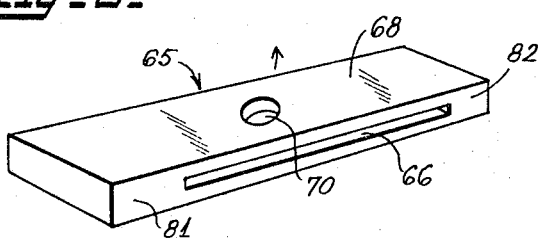
INVENTOR
Oscar A. Yost
BY Polachek & Saulsbury
ATTORNEYS

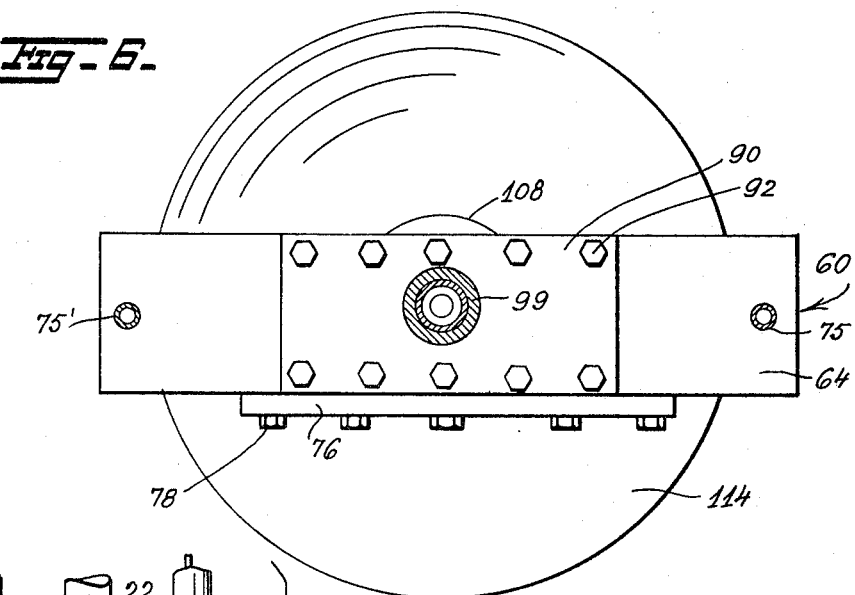
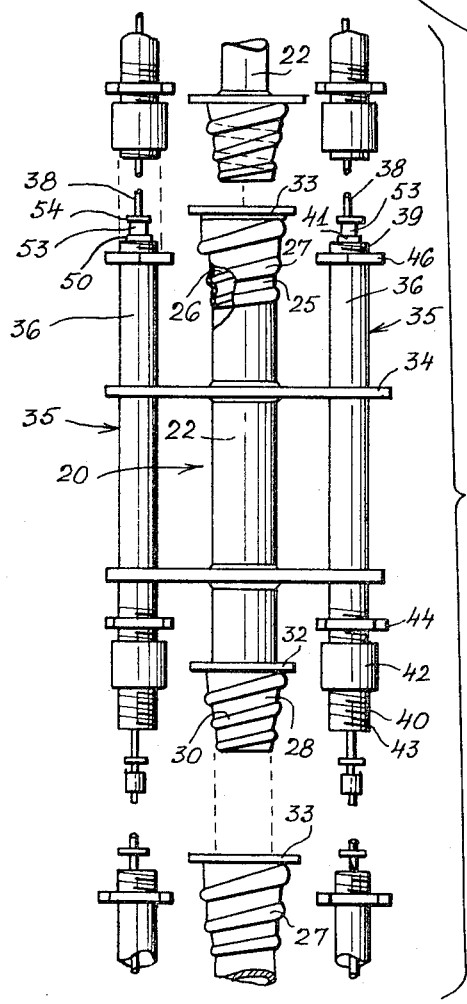

INVENTOR
Oscar A. Yost
BY Polachek & Saulsbury
ATTORNEYS

Jan. 21, 1969     O. A. YOST     3,422,889
FAST PIPE COUPLING FOR OFFSHORE DRILLING
Filed Jan. 3, 1967     Sheet 7 of 7
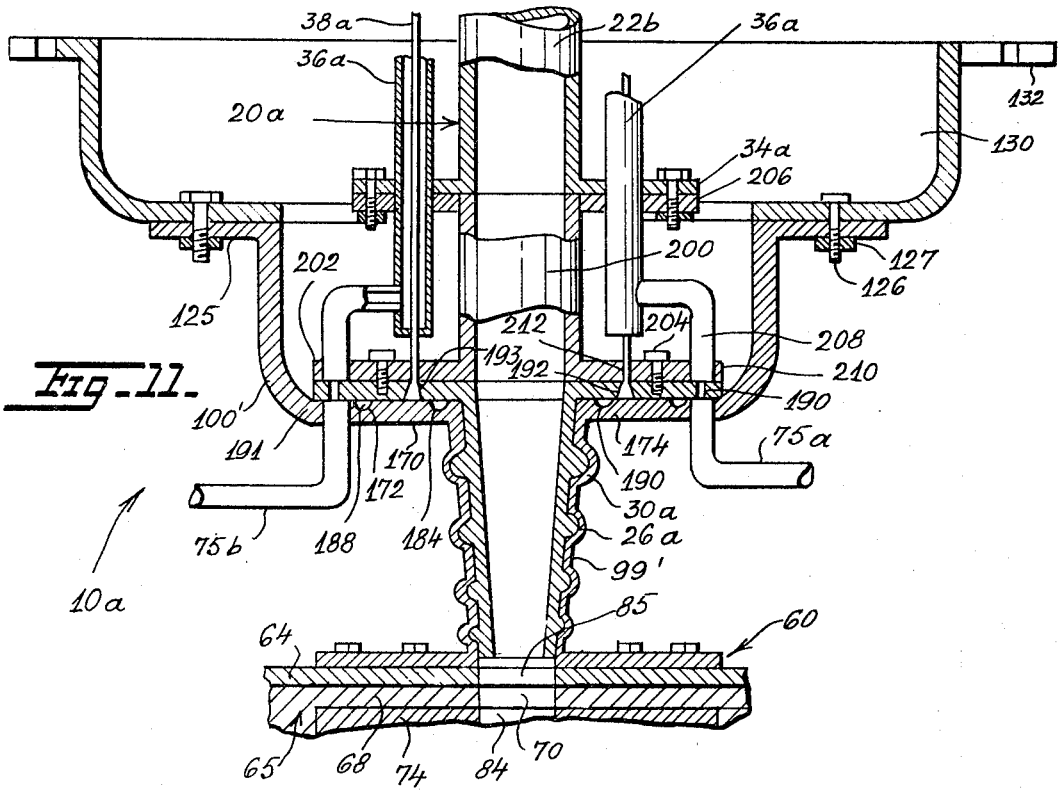
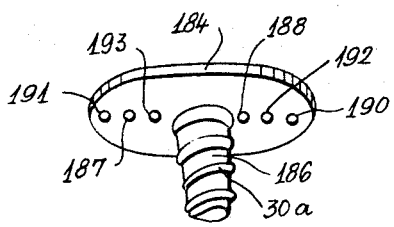
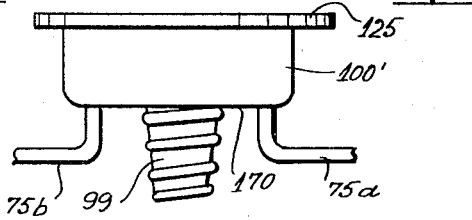
INVENTOR
Oscar A. Yost
BY Polachek & Saulsbury
ATTORNEYS United States Patent Office 3,422,889
Patented Jan. 21, 1969

1

3,422,889
FAST PIPE COUPLING FOR OFFSHORE DRILLING
Oscar A. Yost, 302 W. 22nd St., New York, N.Y. 10011
Filed Jan. 3, 1967, Ser. No. 606,952
U.S. Cl. 166—.5    10 Claims
Int. Cl. E21b 43/01; F16l 37/02, 37/10

ABSTRACT OF THE DISCLOSURE

The disclosure described pipe assemblies for offshore oil wells. The pipe assemblies have pipe sections which are quickly engaged by tapered, helically threaded interfitting ends. Auxiliary laterally disposed pipes convey oil or air to operate an undersea slide valve. Pipes inside the auxiliary pipes convey steam to the bottom of the assembly. A basin is provided at the bottom of the assembly into which excess oil can be drained and pumped out along with sea water and steam. Quick detachable threaded couplings are provided for the auxiliary pipes.

---

This invention concerns quickly assembled and disassembled piping for offshore oil wells, undersea mines, and exploratory holes in ocean bottoms and holes in geologic strata under ocean beds.

According to the invention, there is provided a system of piping in which a main central well casing or pipe assembly is made up of sections having interfitting tapered ends formed with mating threaded spiral ridges and grooves. This construction facilitates quick attachment and detachment of the sections. Some of the sections have flanges which abut flanges of other sections. These flanges can be cemented together to cooperate with the interfitted threaded ends of the sections to effect permanent joints. Some sections may have flanges supporting concentric feeder pipes for oil, air or steam. The steam pipes may terminate at a bell to displace oil which may tend to leak out of the well piping while the sections are loosely engaged. The oil or air pipes terminate at a valve assembly provided at the bottom of the piping assembly for controllably closing and opening the main central well pipe. The lateral piping is provided with cylindrical coupling fittings and lock rings which permits quick attachment and detachment of successive length of lateral piping. The lengths of lateral piping have cylindrical rather than tapered ends with uniform helical threading which enables easy engagement and disengagement of the fittings to the sections of lateral piping. The assembly is provided with a basin for catching excess oil which may leak out of the main piping to prevent contaminating the sea around the installation.

It is a principal object to provide quickly assembled piping for a drilled well mine or hole under the sea, the assembly being adapted for quickly disconnecting it from the well and relocating it at another site.

A second object is to provide a piping assembly for offshore wells, including quickly connectable sections having tapered spirally grooved and ridged interfitting ends, so that cross threading and stripping of threads is prevented.

A third object is to provide a piping assembly as described with an undersea slide valve operable from a barge on the surface of the sea via steam or air lines.

A fourth object is to provide a piping assembly for offshore wells including auxiliary pipe lines connected by quickly engageable and disengageable couplings.

A fifth object is to provide auxiliary pipe lines for an offshore well, wherein the pipe lines have concentric pipes each connected to an adjacent pipe by a quickly engageable and disengageable coupling including a cylindrical union or coupler and two threaded lock rings, the ends of the pipes engaged by the union and lock rings being

2 truly cylindrical and helically threaded with uniform pitch.

A sixth object is to provide auxiliary pipe lines as described, wherein the outer pipes convey air or oil and serve as insulation means for the inner pipes which convey steam.

A seventh object is to provide a piping assembly as described wherein the outer auxiliary pipes are connected to the slide valve for operating the same.

An eighth object is to provide a piping assembly for an offshore well with a catch basin for excess liquid leaking from the well.

A ninth object is to provide a piping assembly for an offshore well with a bell chamber enclosing the catch basin.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 3 is an enlarged fragmentary vertical sectional view taken on line 3—3 of FIG. 1.

FIG. 4 is a fragmentary vertical sectional view taken on line 4—4 of FIG. 2.

FIG. 5 is an exploded perspective view of an enlarged scale of parts of the auxiliary piping.

FIGS. 6 and 7 are horizontal cross sectional views taken on lines 6—6 and 7—7 respectively of FIG. 5.

FIG. 8 is a perspective view on a reduced scale of a slide valve core employed in the slide valve.

Figure 1:
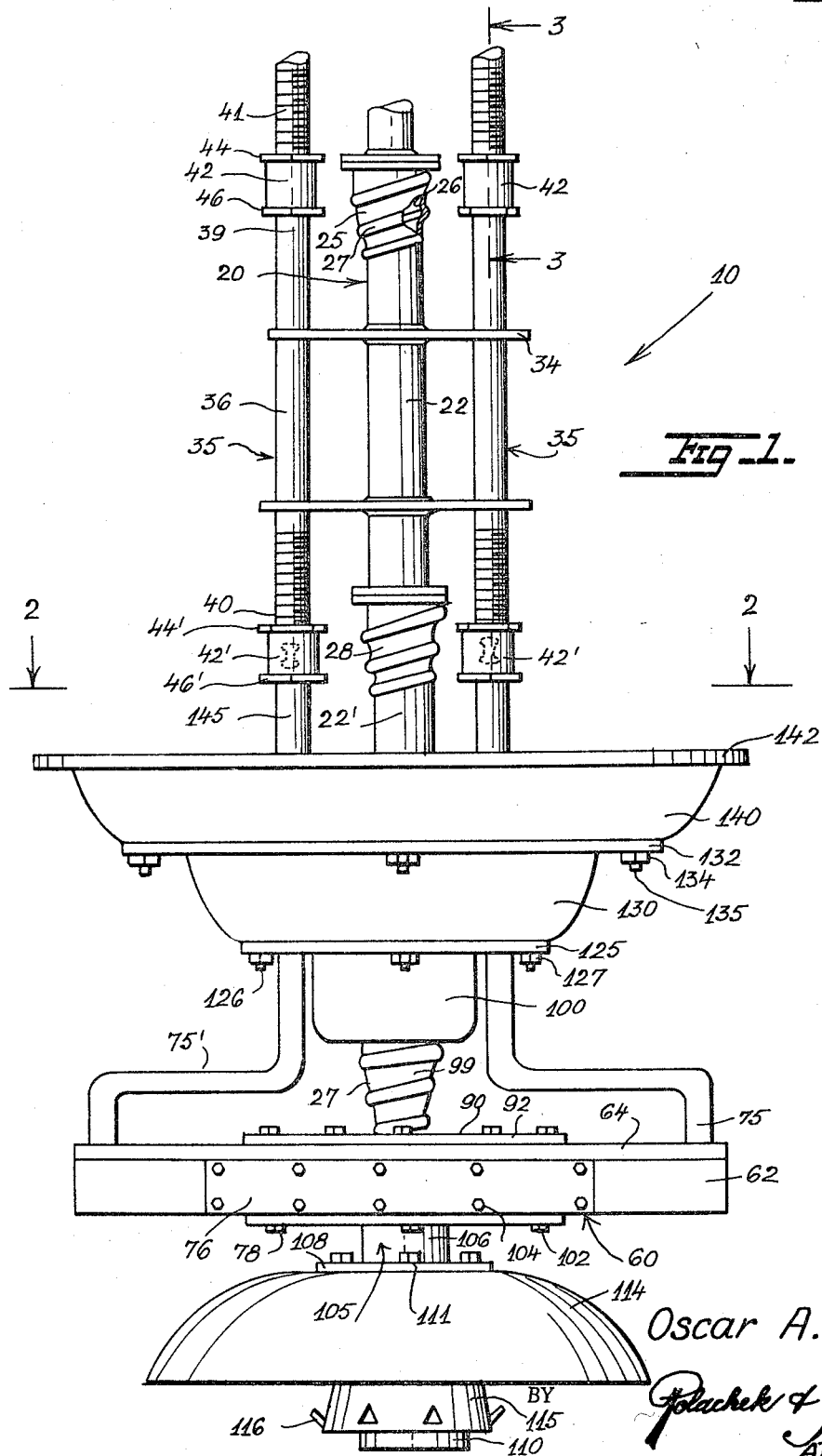
FIGURE 1 is a side elevational view of the lower part of a piping assembly according to the invention including a slide valve, catch basin, anchoring means, main central piping and auxiliary lateral piping.

FIG. 9 constitutes an exploded side view of parts of the assembly of FIG. 1.

Figure 10:
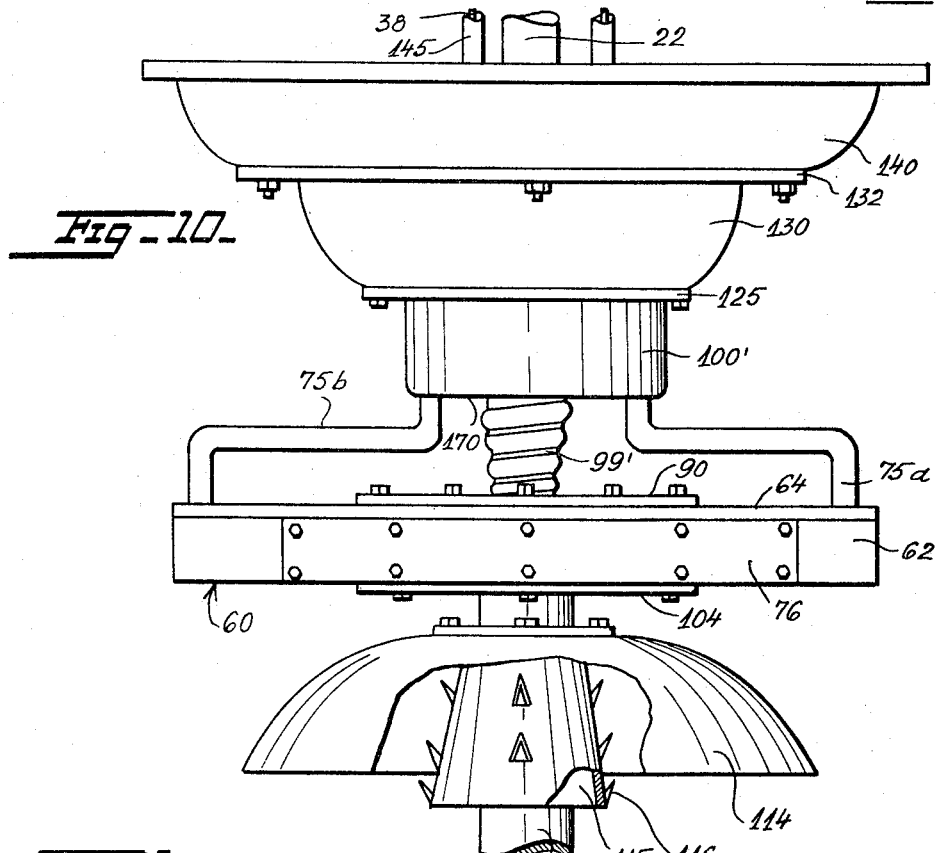

FIG. 10 is a side view of part of another piping assembly embodying the invention.

FIG. 11 is a sectional view similar to FIG. 3 of the piping assembly of FIG. 10.

FIG. 12 is a reduced perspective view of a component of the assembly of FIGS. 10, 11.

FIG. 13 is a reduced side view of a coupling unit employed in the assembly of FIGS. 10, 11.

Figure 14:
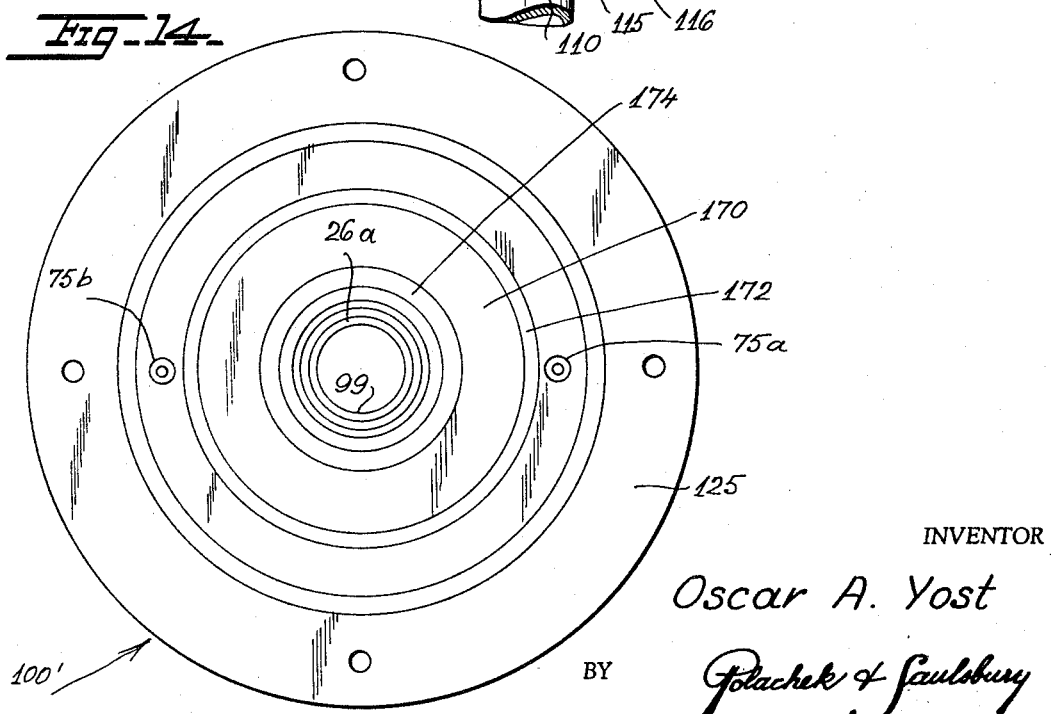

FIG. 14 is an enlarged top plan view of the unit, taken on line 14—14 of FIG. 13.

Referring first of FIGS. 1–9, there is shown a piping assembly comprising a main central pipe 20 having a plurality of axially aligned interfitted sections 22. Each of these sections has an upper outwardly flared end 25 formed with a helical groove 26 inside and presenting a helical ridge 27 outside. The groove and ridge have three turns as shown in the drawing, but it may have more or less than three turns. At its lower end 28 each pipe section has a male threaded portion which is tapered inwardly and provided with a helical ridge 30. The mating ridges and grooves of the several sections are progressively narrowed in width from upper to lower ends thereof. By this arrangement each lower male end of a pipe section will thread readily into the upper female end of an upper pipe section and as the upper section is screwed tight a liquid tight seal will be effected. However, if the upper section is slightly turned, then the grip of the upper section to the lower section is released. This arrangement makes it possible to quickly assemble and disassemble a multiplicity of pipe sections for conducting liquid or even gas from a well under a body of water such as an ocean, sea, lake and the like.

Each pipe section 22 has an annular flange 32 at its lower end just above ridge 30. This flange abuts a similar flange 33 at the other end of the adjacent pipe section just above ridge 27. If a permanent joint is to be made, the facing sides of these ridges can be coated with a suitable waterproof cement. Then when the connecting sections are secured together, the cement will form a permanently bonded, hermetic seal.

Each pipe section 22 may have one or more flange plates 34 extending transversely thereto and supporting two auxiliary pipe sections 35 axially parallel to the main central pipe section and offset laterally therefrom. Each auxiliary pipe section 35 includes an outer axially vertical pipe 36 and an inner axially aligned pipe 38. As best shown in FIGS. 3 and 5, each outer pipe 36 has upper and lower true cylindrical ends 39, 40. The ends are threaded externally with uniform helical threading 41, 43. The upper threading 41 is shorter axially of the pipe than the lower threading 43. The pipe sections 35 are shorter than the main central pipe sections so that short spaces S are left between adjacent ends of the outer pipes. These spaces are bridged by cylindrical internally threaded unions or couplers 42. Internally threaded lock rings 44, 46 are provided above and below the couplers 42. The lower rings 46 are normally screwed down as far as possible on upper threaded ends of the pipes 36. The couplers are screwed down on the upper ends of pipes 36 and bear on the lock rings 46 while upper ends of the couplers are engaged on the lower ends 40 of the upper pipes. The lock rings 44 are screwed on the ends 40 of the upper pipes and bear on the upper ends of the cylindrical couplers. If desired, waterproof cement can be applied to the flat faces of the rims 44, 46 which face adjacent abutted flat ends of the couplers 42 to effect hermetic seals thereat.

Pipes 38 are also threaded at their upper and lower ends. The upper end 48 of each pipe 38 extends outwardly beyond upper end of the concentric surrounding pipe 36. Similarly the lower end 49 of each pipe 38 extends outwardly beyond the lower ends 40 of the surrounding pipes 36. The ends of pipes 38 are right cylinders. They are uniformly threaded. Lower threading 52 is longer axially of the pipe 38 than upper threading 50. Cylindrical unions or couplers 53 which are internally threaded engage threaded ends of adjacent pipes 38. Lock rings 54, 56 are provided above and below the couplers 53 and bear against ends of the couplers. It will be noted that the rings 54, 56 are smaller in diameter than internal diameters of pipes 36. Spaces S' separate the internal pipes 38.

By the arrangement described, each lock ring 44 and union coupler 42 can be screwed upwardly on the longer lower threading 43 to clear the upper end of the lower pipe 36. When this is done, space S is clear and the lock rings 54, 56 and coupler 53 are exposed. Ring 54 and coupler 53 can be screwed upwardly on threading 52 of the upper lower pipe 38. This will wholly disengage the adjacent pipe sections 35. It will be apparent that successive pipe sections 35 can be easily connected together after the main central pipe sections are connected together. The upper pipe assembly including a central pipe section 22 and one or two pipe sections 35 can be supported by a crane from a drilling barge, a tower, derrick or boat. The assembly will be turned until the central pipe section 22 is connected to the next lower main central pipe section 22 previously set in place. When the upper pipe section 22 is in place, the auxiliary pipes 36 and 38 will be in alignment and ready for connection. This can be done by divers or by wrenches operated mechanically by remote control from the drilling barge, tower or boat. The pipes 36 are used to convey oil, air or other fluid to an undersea valve 60 at the bottom of the installation. Pipes 38 are employed to convey steam, drilling mud, detergent or other liquid to the bottom of the installation. Pipes 36 may serve to insulate inner pipes 38 carrying steam.

Figure 2:
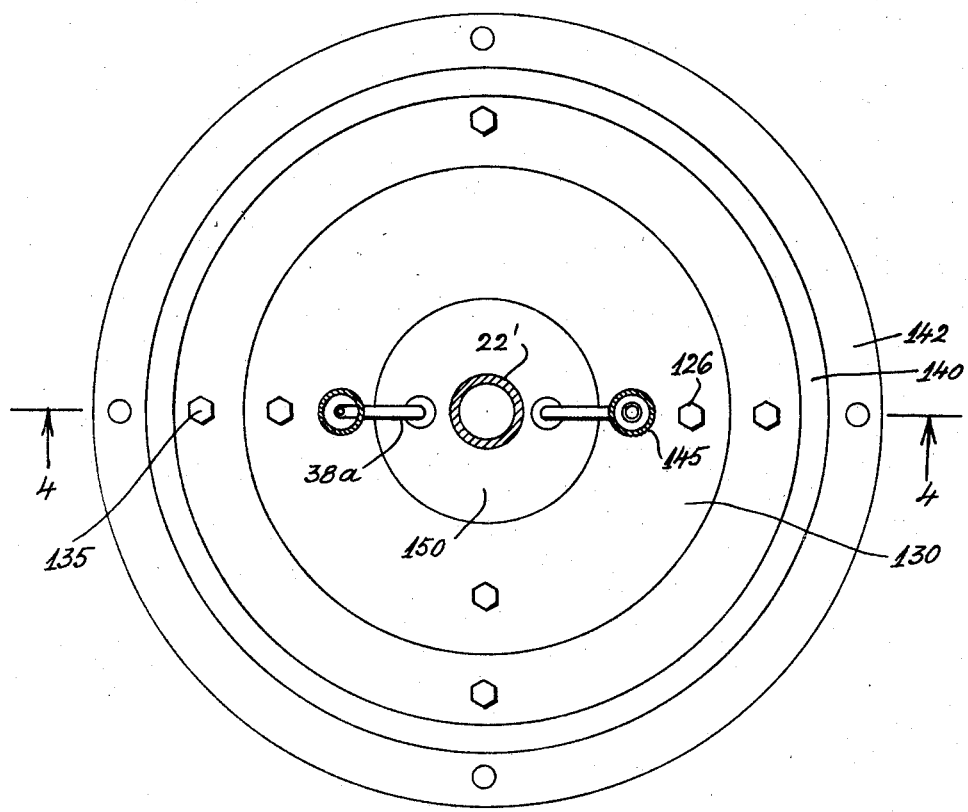
FIG. 2 is a horizontal cross sectional view taken on line 2—2 of FIG. 1.

Referring now to FIGS. 1, 2 and 4, the assembly includes a rectangular slide valve 60. This slide valve has an outer boxlike casing 62 closed by an upper plate 64. Inside the hollow casing is a valve core 65 best shown in FIGS. 6, 7 and 8. This valve core is a flat rectangular plate formed with a central slot 66 parallel to opposite sides 68 of the core. Aligned holes 70 are formed in the sides 68 of the core. The core is shorter than the rectangular compartment 72 defined by the casing. The core slides longitudinally.

A central plate 74 extends transversely of the casing inside the slot 66 and serves as a support, guide and stop member to limit reciprocating motion of the valve core. Pipes 75, 75' open into the compartment 72 at opposite ends of the top plate 64. A flange 76 secured by bolts 78 retains plate 74 in the casing. Oil or other fluid 80 is conveyed alternately through pipes 75, 75' to opposite ends of the compartment 72 under pressure which is applied to the flat head ends 81, 82 of the valve core to slide it to the right or left as shown in FIG. 4. When the valve core is at the left, there is an open passage between holes 70 and a hole 84 formed in plate 74. When the valve core is at the right, the sides 68 of the valve core close off the passage defined by aligned holes 84, 85, 86, in plate 74, top plate 64 and bottom wall 88 of the casing.

A rectangular flange plate 90 is secured by bolts 92 to the top plate 64. This plate has a hole 94 aligned with holes 70, 84–86. Integral with flange plate 90 is a flaring female helically threaded nipple 99 which receives the tapered threaded end of the lowest main central pipe section 22'. A basin 100 open at the top is integral with and surrounds the nipple 99.

Secured to the underside of the valve by bolts 102 is another flange plate 104 of a coupler 105. A short nipple 106 extends downwardly from plate 104 and has an annular flange 108 at its lower end. The coupler 105 can be fitted on the upper end or head 109 of a well casing or well pipe 110 which extends into the earth under the sea as far as desired. Flange 108 is secured by bolts and nuts 111, 112 to the top of a dome-shaped bell 114. This bell will normally rest on or preferably will sink into the soft bottom of sea where the installation is located. A conical anchor 115 provided with barbs 116 will penetrate the bottom of the sea and will help anchor the bell and entire installation at the well site. Holes 117, 118 in the bell and flat top 120 of the anchor are aligned with axial passage in the coupler 105 and with the aligned holes in the valve 60. Flange 119 on the well head abuts top 120 of the anchor. By the arrangement described, the installation is stabilized at the bottom of the sea and the head of the well is controllably opened and closed by means of the valve 60.

The basin 100 has an upper annular flange 125 secured by bolts and nuts 126, 127 to the underside of an intermediate basin section 130. Basin section 130 has an annular flange 132 at tis upper end secured by bolts 134 and nuts 135 to the bottom of an upper basin section 140. This section in turn has a flange 142 which can be secured to still another basin section and so on. Each upper basin section has a larger diameter so that the basin assembly flares outwardly from the bottom basin 100. Vertical portions 145 of pipes 75, 75' extend through holes in flange 125 and the bottom of basin 130. Upper ends of the pipe portions 145 are threaded. Couplers 42' join lower pipes 36 to pipe portions 145 and are secured in place by lock rings 44', 46'.

Surrounding the lowermost pipe section 22' is a dome 150 frictionally fitted thereto. This dome bears on the bottom of basin 130; see FIG. 4. Holes 152 are provided in the top of the basin. These holes are aligned with the flared bottom ends of elbow pipes 38A forming continuations of pipes 38' inside of straight pipe sections 145. A compartment 160 is defined between the dome 150 and basin 100.

In normal operation of the installation, valve core 65 will be moved to the open position shown in FIG. 4. This is done by passing compressed air or oil or other fluid under pressure down through aligned pipes 36 and the pipe 75 at the right end of the valve 60. Oil or other liquid can be drawn up out of the well through pipe 110. Suppose now that it is desired to close off the well. Fluid under pressure will now be passed down through pipe 75' to move the valve core to the right to close the valve. Couplings or unions 42' and 53' will now be disconnected and the pipe assembly including the lowermost pipe section 22' will be rotated one half or one turn. Couplings 53' will now be reconnected. At this time, the bottom ends of elbow pipes 38a which are normally spaced from the top of dome 150 will bear on the top of the dome in alignment with holes 152. Now steam or other liquid can be passed down the aligned inner pipes 38 and the lowermost pipes 38'. The steam will be forced into compartment 160.

It will be noted that when the lowermost pipe section 22' is loosened after the valve 60 is closed, any oil or other liquid in the pipe section will drain into the basin 100, and may even go as high as basin 130. Some salt sea water will of course enter compartment 160. However, as the steam is passed into compartment 160 under high pressure, a pumping action is applied from a pump at the upper end of the main central pipe 20 to which pipe section 22' is still connected. The mixture of steam, sea water and oil in pipe section 22' will be drawn up through pipe section 22' until all the oil is drained out of the basin 100 and the line of pipes 22, 22'. When pipe section 22' is clear of oil, although filled with sea water, pipe couplings 53' will be disengaged and pipe section 22' will be unscrewed from nipple 99. Pipe section 22' will slip out of the dome 150 which remains in the basin section 130.

The basin 100 along with basin sections 130 and 140 serve an additional important function besides catching and retaining excess oil as already described. They remain under the sea at the location of the well. The basin assembly has a generally tapered construction. Thus it can serve as a guide in helping to locate the well when it is desired to reconnect pipe section 22' to the well for opening the well again at a future time.

FIGS. 10 to 14 to which reference is now made show assembly 10A. This is another embodiment of the invention which is generally similar to the piping assembly 10 described in connection with FIGS. 1-9. Corresponding parts are identically numbered. In assembly 10, it may be found troublesome to disconnect and then reconnect the lowermost coupling unions 53' when the well 110 is to be closed off as already described; and it may not be desirable to leave dome 150 in the basin assembly. Assembly 10A avoids this situation.

Assembly 10A provides another nipple 99' with annular flange 170 having two concentric grooves 172, 174 in its upper side. Flange 170 is integral with basin 100'. Flange 184 overlies flange 170 and is integral with tapered externally threaded fitting 186 which engages with the tapered helical groove 26A in nipple 99'. It will be noted that the helical threading 26A and 30A have four turns. All the other piping sections in the main line of piping 20A may also have four turns of the threads if desired. A pair of projections 187, 188 is provided at the underside of flange 184. These projections rotate in the grooves 172, 174 when the fitting 186 is being tightened in nipple 99'. Four holes 190–193 are provided in flange 184. Holes 190, 191 are aligned with pipes 75A, 75B which terminate at the valve 60 in the same manner as pipes 75, 75' already described. Pipes 75A, 75B are secured in openings in the flange 170. Holes 190, 191 aligned with pipes 75A, 75B when the fitting 186 is fully tightened in the nipple 99'.

A coupling spool 200 is provided for the assembly. This spool has a lower annular flange 202 which overlies flange 184. Bolts 204 secure flange 202 to flange 184.

Air or oil conducting pipes 36A extend through lower flange 34A of the pipe assembly 20A and through upper flange 206 of the spool 200. Bottom ends of pipes 36A are closed and have branches 208 terminated in holes 210 in flange 202. Branch pipes 208 are aligned with holes 190, 191 and with pipes 75A, 75B. Inner pipes 38A extend down through flanges 34A, 206 and terminate in holes 212 in flange 202. There the pipes 38A open into holes 192, 193 in flange 184. Flange 34A on lowermost pipe section 22B is secured by bolt and nuts 222, 223 to flange 206.

By the arrangement described, it will be apparent that air or oil under pressure passed down the right pipe 75A will open valve 60 and air or oil passed down pipe 75B will close valve 60. Suppose that the well 110 is to be closed. First valve 60 will be closed. Then the entire lowermost pipe assembly will be turned to loosen fitting 186 from nipple 99'. After the assembly is turned less than one turn steam is forced down through the steam conducting pipes 38A into the narrow space opened up under flange 184 in basin 100'. Sea water will enter the basin and mix with the steam and oil discharged from spool 200 into the basin. A pump (not shown) at the upper end of the main central piping 20B will then be put to work to pump out the mixture of oil, steam and sea water in the basin 100. When the basin 100 is clear of oil, the fitting 186 can be completely unscrewed from the nipple 99'. Discharge of oil from the piping 20B into the surrounding sea water is prevented, and contamination of the sea by such oil is avoided. This feature of the invention which is also characteristic of the assembly 10, is very important since injury to fish and other sea creatures by oil discharge is prevented.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. A pipe assembly for an offshore well comprising a plurality of axially vertical wide pipes, each of said pipes having an upper outwardly flaring end formed with a helical multiturn groove of progressively narrowing width from top to bottom, each of said pipes also having a lower tapered end formed with a helical multiturn ridge of progressively narrowing width for engaging in the flaring end of an adjacent lower pipe, whereby turning any pipe less than one turn with respect to an adjacent interconnected lower pipe opens a space between two interconnected pipes for the entire length of their interconnected ends.

2. A pipe assembly for an offshore well as recited in claim 1, further comprising a slide valve located at the head of the well in the sea, a flaring internally grooved fitting secured to said valve, the tapered end of the lowermost one of said pipes being engaged in said fitting and detachable therefrom by rotating said lowermost pipe, said valve having a slidable core for opening and closing a passage between the well and said pipes.

3. A pipe assembly as recited in claim 2, further comprising a basin extending upwardly from said fitting for retaining excess oil draining out of the lowermost one of the wide pipes when the same is disengaged from said fitting.

4. A pipe assembly as recited in claim 2, further comprising a plurality of other pipes narrower than said auxiliary pipes and respectively disposed axially inside the auxiliary pipes for conveying steam under pressure while the outer auxiliary pipes serve to insulate the inner other narrow pipes having opposite threaded ends extending outwardly beyond one of the auxiliary pipes, and another cylindrical coupling member coupling spaced ends of adjacent narrow other pipes with other lock nuts respectively above and below said other coupling member, whereby any pair of narrow other pipes can be decoupled after a corresponding pair of surrounding auxiliary pipes are decoupled to expose the other coupling member in the space between the decoupled auxiliary pipes.

5. A pipe assembly as recited in claim 2, further comprising a pair of axially vertical auxiliary pipes disposed laterally of each of the wide pipes, each of said auxiliary pipes having axially longer helical threading at its lower end and axially shorter threading at its upper end, the upper and lower ends of the auxiliary pipes being cylindrical, the upper end of each auxiliary pipe being spaced from the lower end of an axially aligned other auxiliary pipe, a cylindrical coupling member joining the spaced ends of the adjacent aligned auxiliary pipes and lock nuts respectively above and below the coupling member, whereby each pair of coupled auxiliary pipes can be decoupled by screwing the coupling member and an upper lock nut on the axially longer threading of an upper auxiliary pipe.

6. A pipe assembly as recited in claim 5, the lowermost ones of the interconnected auxiliary pipes are connected to opposite ends of said slide valve respectively for selectively opening and closing said valve by passing fluid under pressure to the valve.

7. A pipe assembly as recited in claim 5, further comprising a basin of generally flaring configuration connected to said fitting and extending upwardly therefrom for retaining excess oil draining out of the lowermost one of the wide pipes when the same is disengaged from said fitting, and a plurality of other pipes narrower than said auxiliary pipes and respectively disposed axially inside said auxiliary pipes, each of the other pipes having opposite threaded ends extending outwardly beyond one of the auxiliary pipes, and another cylindrical coupling member coupling spaced ends of adjacent other pipes with other lock nuts respectively above and below said other coupling member, whereby any pair of the narrow other pipes can be decoupled after a corresponding pair of surrounding auxiliary pipes are decoupled to expose the other coupling member in the space between decoupled auxiliary pipes, the lowermost ones of said narrow other pipes terminating in said basin to convey steam thereto for diluting sea water and oil discharged into the basin when the lowermost one of said wide pipe sections is disengaged from said fitting.

8. A pipe assembly as recited in claim 7, further comprising a dome in said basin surrounding the lowermost one of the wide pipes, the lowermost ones of the narrow other pipes extending laterally outwardly of the lowermost ones of the auxiliary pipes and terminating just above said dome, said dome having holes therein aligned with said lowermost ones of the narrow other pipes so that the lowermost ones of the narrow other pipes discharge steam into a chamber defined between said dome and said basin when the lowermost one of the wide pipes is loosened from said fitting.

9. A pipe assembly as recited in claim 1, further comprising a slide valve located at the head of the well in the sea, a flaring nipple with internal helical groove secured to said valve, a basin with integral first flange extending outwardly of the nipple, a tapered fitting with external helical ridge engaged in said fitting, said fitting having a second flange overlying the first flange, other pipes connected to opposite ends of the valve and terminating in first holes in the first flange, said second flange having second holes communicating with the pipes at the first flange, a spool-shaped coupling member connecting said fitting, and another wide pipe connecting said spool-shaped coupling member to the lowermost one of the first named wide pipes, so that oil is conveyed from the well through the fitting, spool-shaped coupling member, other wide pipe and the interconnected first named wide pipes, said spool-shaped member having a lower third flange overlying said second flange, and auxiliary pipes connected to said third flange and aligned with second and third holes and with said other pipes for conveying fluid under pressure to the valve for operating the same.

10. A pipe assembly as recited in claim 9, wherein said second flange and said third flange have further aligned holes, and narrow pipes disposed inside said auxiliary pipes and connected to the further holes in said third flange for discharging steam into the basin to dilute sea water and oil therein when the fitting is disengaged from the nipple, said first and second flanges having interfitting circumferential grooves and projections to guide the second flange in rotation as the fitting is screwed tight with the nipple.

References Cited
UNITED STATES PATENTS

| | | | |
|---|---|---|---|
| 3,280,906 | 10/1966 | Todd | 166—.6 |
| 3,324,943 | 6/1967 | Price | 166—.6 |
| 3,332,484 | 7/1967 | Watkins | 166—.6 |
| 3,354,951 | 11/1967 | Savage et al. | 166—.6 |

CHARLES E. O'CONNELL, *Primary Examiner.*

R. E. FAVREAU, *Assistant Examiner.*

U.S. Cl. X.R.

285—13, 33